United States Patent [19]
Shin et al.

[11] Patent Number: 5,642,166
[45] Date of Patent: Jun. 24, 1997

[54] BI-DIRECTIONAL MOTION ESTIMATION METHOD AND APPARATUS THEREOF

[75] Inventors: Jae-seob Shin; Shi-hwa Lee; Yang-seock Seo, all of Seoul, Rep. of Korea

[73] Assignee: Samsung Electronics Co., Ltd., Kyungki-do, Rep. of Korea

[21] Appl. No.: 366,096

[22] Filed: Dec. 29, 1994

[30] Foreign Application Priority Data

Aug. 30, 1994 [KR] Rep. of Korea ............... 1994-21560

[51] Int. Cl.[6] ................................................ H04N 7/32
[52] U.S. Cl. ................................... 348/416; 348/699
[58] Field of Search ......................... 348/384, 390, 348/400–402, 407, 409–413, 415, 416, 420, 699; 382/232, 190, 195, 203, 236, 238, 242, 243; H04N 7/130, 7/137

[56] References Cited

U.S. PATENT DOCUMENTS

| | | |
|---|---|---|
| 4,864,394 | 9/1989 | Gillard . |
| 5,060,064 | 10/1991 | Lamnabhi et al. . |
| 5,103,305 | 4/1992 | Watanabe .......................... 382/236 |
| 5,136,659 | 8/1992 | Kaneko et al. .................... 382/243 |
| 5,151,784 | 9/1992 | Lavagetto et al. . |
| 5,198,901 | 3/1993 | Lynch .............................. 348/413 |
| 5,351,095 | 9/1994 | Kerdranvat ........................ 348/416 |
| 5,488,430 | 1/1996 | Hong ............................... 348/699 |

OTHER PUBLICATIONS

Kojima et al., "Motion Detection Using 3D–FET Spectrum"; 1993 IEEE; pp. V213–V216.

Cheong et al., "Motion Estimation with Wavelet Transform and the Application to Motion Compensated Interpolation"; 1993 IEEE; pp. V217–V220.

*Primary Examiner*—Tommy P. Chin
*Assistant Examiner*—Richard Lee
*Attorney, Agent, or Firm*—Leydig, Voit & Mayer

[57] ABSTRACT

A bi-directional motion estimation method and apparatus thereof in a low bit-rate moving video codec system, for filtering motion vectors by performing a bi-directional motion estimation in units of objects having the same motion in a constant domain and for compensating the motion using the motion vectors generated as the result of forward or backward motion prediction in accordance with the motion prediction mode of previously set frames, can determine the precise motion vector compared to the existing block matching algorithm and depict the inter-frame motion with a smaller amount of information. Therefore, markedly less data (for compression) is used and reconstructed picture quality is improved.

4 Claims, 4 Drawing Sheets

$(N+1)^{th}$ FRAME

BI-DIRECTIONAL MOTION ESTIMATION METHOD AND APPARATUS THEREOF

BACKGROUND OF THE INVENTION

The present invention relates to a bi-directional motion estimation method and apparatus thereof in a moving image video codec system having a low bit-rate, and more particularly, to a motion estimation method and apparatus thereof, for compensating a constant domain using only motion vectors, by performing a bi-directional motion estimation in units of filtered objects.

In today's information society, there is an tendency toward larger amounts of information to be received and processed. Accordingly, in order to utilize existing transmission bands more efficiently, data compression is essential. Specifically, with regard to digital video which require very large memory capacities, compression enables the efficient storage, detection and transmission of such large quantities of information. Therefore, many video data compression technologies have been developed.

Video data compression technology (coding methods) can be classified as being lossy or lossless according to the degree of information loss when employed. This technology can be further divided into an intra-frame coding method by which the spatial overlap present in a still image is removed, and an inter-frame coding method by which the time overlap present in a moving image is removed.

On the other hand, another kind of classification for video data compression can be made; that is, in accordance with whether the technique is a "first generation" or a "second generation" coding method. In first generation coding, information loss is small and international standards are in the course of being established. First generation coding methods include spatial coding (e.g., pulse-coded modulation, differential pulse-coded modulation or delta modulation), transform coding (e.g., Karhunen-Loeve, Fourier, Harr, Hadamard, sine or cosine), hybrid coding which combines the spatial and transform coding techniques, and motion compensated coding which is used for moving pictures. In second generation coding, specific image characteristics are used in conjunction with the human visual system itself. Second generation coding methods include pyramid coding, anisotropic nonstationary predictive coding, contour-texture oriented techniques, and directional decomposition based coding.

Among the above-mentioned methods, the motion-compensated coding method is used for high-definition television (HDTV) broadcasting systems and standardized schemes of the Moving Picture Experts Group (MPEG). Motion estimation methods used in motion-compensated coding include a pel-recursive algorithm and a block matching algorithm, and even though the pelrecursive algorithm is more precise, block matching is widely used for moving image systems in view of real-time processing and simplified circuit implementation. In using the block matching algorithm, an image is partitioned into blocks having a constant size, e.g., 16×16 or 8×8, and then a motion vector for each block is obtained using a minimum absolute error. The block matching algorithm (disclosed in U.S. Pat. Nos. 5,151,784, 5,060,064 and 4,864,394) is used for the MPEG-1 and MPEG-2 standards.

In addition, there has been proposed a method by which a spatial coordinate is changed into a frequency coordinate using a fast Fourier transform (FFT) coefficient and then the motion is estimated using the peak distribution of frequency data (see "Motion Detection Using 3-D FFT Spectrum," by Arica Kojima, Norihoko Sakurai and Junichi Kishikami, in '93 ICASSP, April 1993). Similarly, a motion estimation method using a wavelet transform (WT) technique has also been proposed (see "Motion Estimation with Wavelet Transform and the Application to Motion-compensated Interpolation," by C. K. Cheong, K. Aizawa, T. Saito and M. Hatori, in '93 ICASSP, April 1993).

All of the these methods have advantages in that they can estimate motion with relative precision for most video sequences. However, with the block-matching methods, it is not possible to search motion vectors if objects of contrasting motion are contained in a given block. Further, the FFT and WT methods result in a waste of processing time and an overly complex transformation of the spatial coordinates. Also, since the structural variation of a moving object through an image is not considered, object-based motion cannot be estimated precisely.

Due to the drawbacks of the above methods, they cannot be adopted for the digital video compression of next-generation moving image communication systems such as video telephones, video conferencing and other types of audio-video communication using an integrated service digital network (ISDN).

SUMMARY OF THE INVENTION

In order to solve the aforementioned problems, therefore, it is an object of the present invention to provide a motion estimation method for compensating a constant domain only by motion vectors by filtering moving objects in a given domain in an arbitrary type and performing a bi-directional motion prediction in the unit of filtered objects, in a low bit-rate moving image codec system.

It is another object of the present invention to provide an apparatus which is most appropriate for implementing the motion estimation method.

To accomplish the first object, the motion estimation method in a low bit-rate moving image codec system according to the present invention, comprises the steps of: (a) estimating the motion of an object having the same motion for the domain where motion is generated at a predetermined block in a frame and filtering motion information representing in which direction the object searched in the current frame has moved and shape information of the object; (b) filtering motion information representing in which direction the object is to be moved in the next frame and index information of the object, using the shape information of the object searched in the current frame by the step (a); and (c) selectively transmitting the information and shape information output in the step (a) or the motion and index information output in the step (b) in accordance with the motion estimation modes of previously set frames.

To accomplish the second object, the bi-directional motion estimation apparatus in a low bit-rate according to the present invention, comprises: backward motion estimation means for estimating the motion of an object having the same motion for the domain where motion is generated at a predetermined block in a frame and filtering motion information representing in which direction the object searched in the current frame has moved and shape information of the object; forward motion estimation means for filtering motion information representing in which direction the object is to be moved in the next frame and index information of the object, using the shape information of the object searched in the current frame by means of the backward motion estimation means; and mode and data selection means for selectively transmitting the information and shape information output from the backward motion estimation means or the motion and index information output from the forward motion estimation means in accordance with the motion estimation modes of previously set frames.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
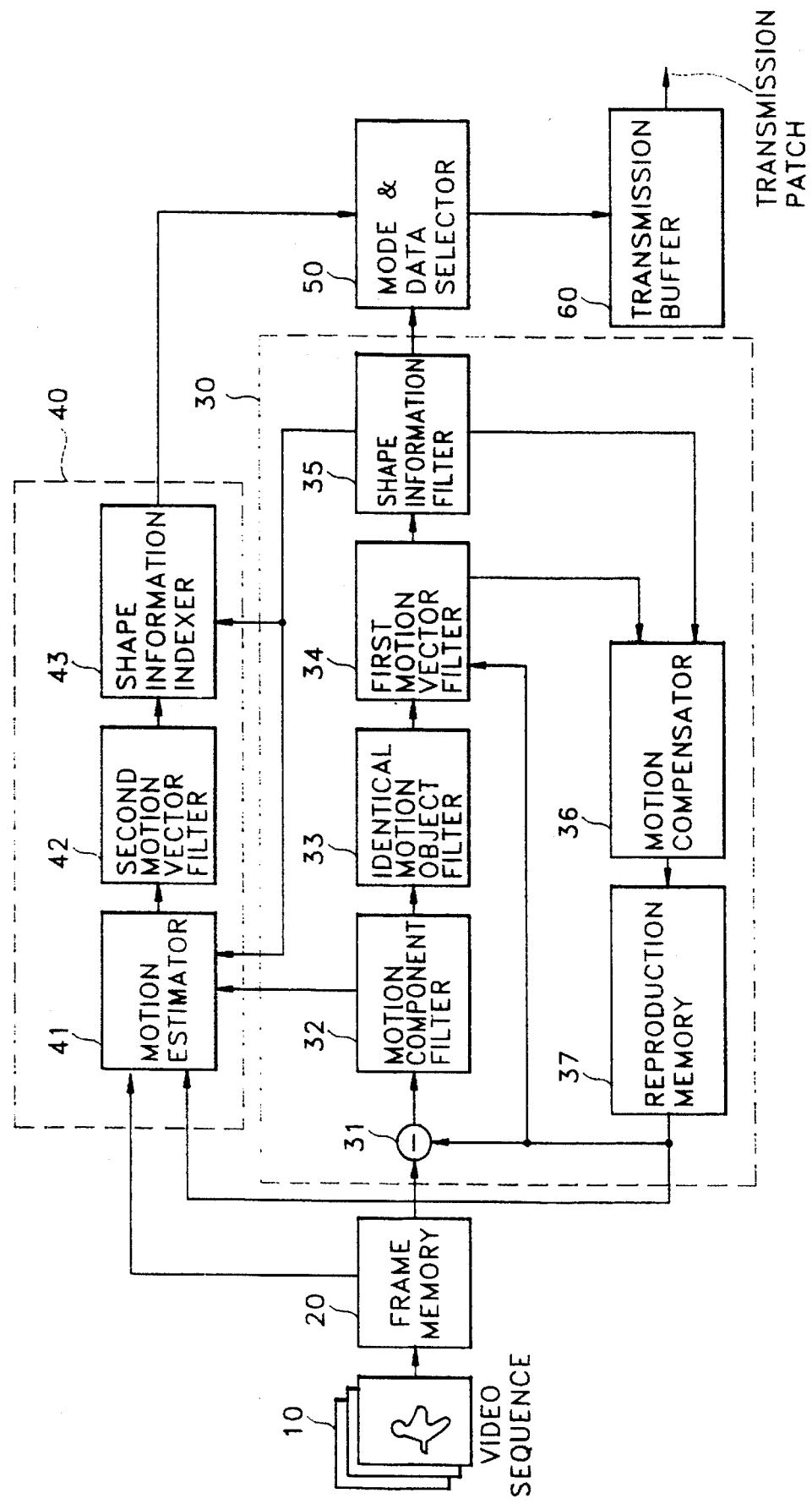
FIG. 1 is a block diagram of a bi-directional motion estimating apparatus according to an embodiment of the present invention.

In FIG. 1, the bi-directional motion estimating apparatus according to an embodiment of the present invention includes a frame memory 20 for storing input video sequences 10 for each frame, a forward motion estimator 40 and a backward motion estimator 30 for estimating forward and backward motions independently with respect to the video sequences 10 stored in frame memory 20, a mode and data selector 50 for determining whether the current frame selects a forward estimation mode or a backward estimation mode by receiving the motion estimation result of forward motion estimator 40 and backward motion estimator 30 and for selectively outputting the corresponding data in accordance with the motion estimation mode of the current frame, and a transmission buffer 60 for transmitting the data output from mode and data selector 50 at a constant rate. Forward motion estimator 40 is constituted by a motion estimator 41, a second motion vector filter 42 and a shape information indexer 43. Backward motion estimator 30 is constituted by a subtractor 31, a motion component filter 32, an identical motion object filter 33, a first motion vector filter 34, a shape information filter 35, a motion compensator 36, and a reproduction memory 37.

Figure 2:
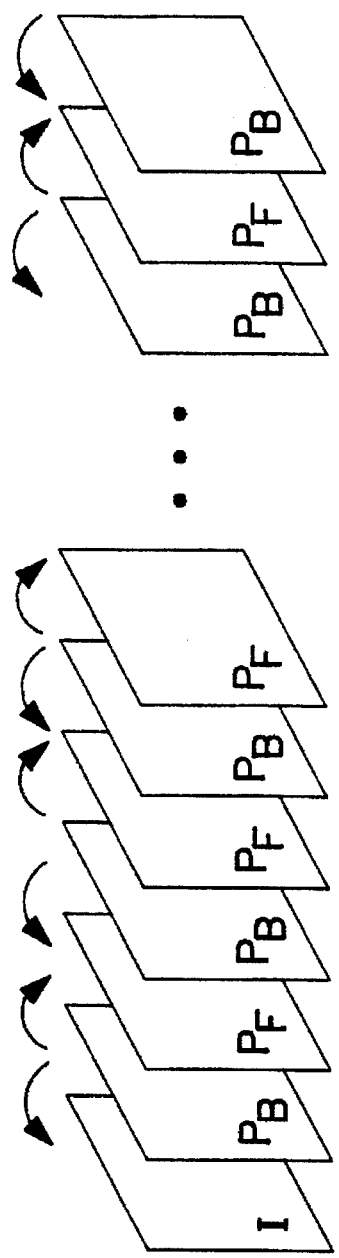
FIG. 2 shows the frame arrangement illustrating the relationship between forward motion prediction and backward motion prediction adopted for the present invention.

FIG. 2 shows the frame arrangement illustrating the relationship between forward motion prediction and backward motion prediction adopted in the present invention, where among consecutive video sequences, only the first frame is transmitted to a receiver stage as an intra-frame I, and thereafter, the motion of the odd consecutive frames is estimated by the backward estimation mode ($P_B$) and the motion of the even consecutive frames is estimated by the forward estimation mode ($P_F$).

Figure 3:
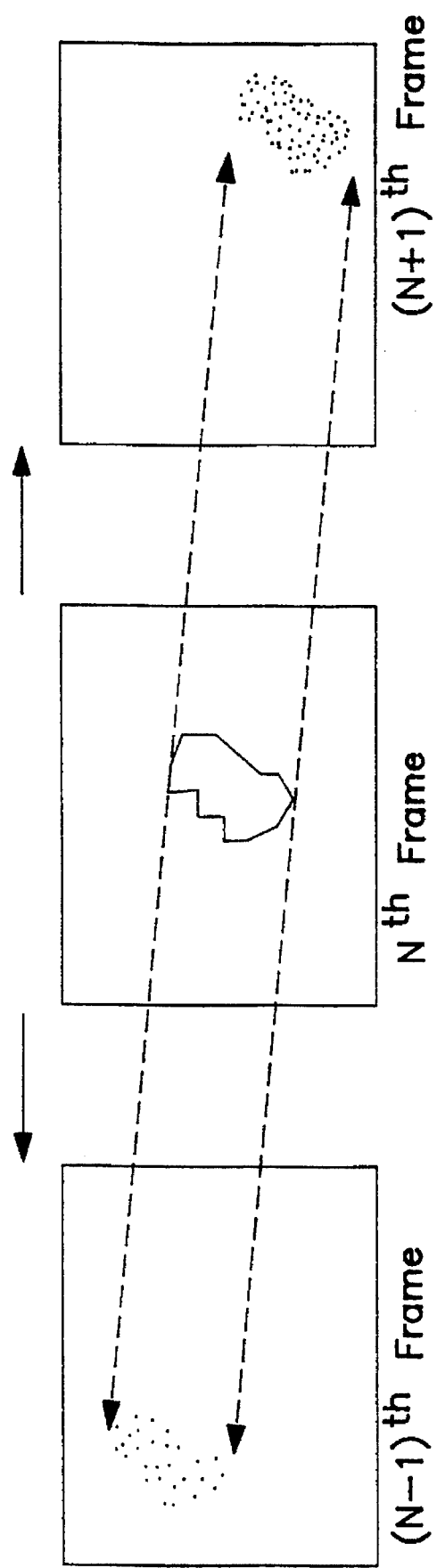
FIG. 3 illustrates the direction of estimating the motion of an object at the current frame (N), previous frame (N−1) and next frame (N+1)

FIG. 3 illustrates an example of backward motion and forward motion estimation being performed for a selected object (i.e., a distinct object having a given motion). First, based on an object filtered in the Nth frame (current frame), the movement distance of the object is estimated from the (N−1)th frame (preceding frame), which is called backward motion estimation. With respect to the (N+1)th frame (next frame), it is searched how far has the object of the Nth frame moved, which is called forward motion estimation.

Figure 4A:
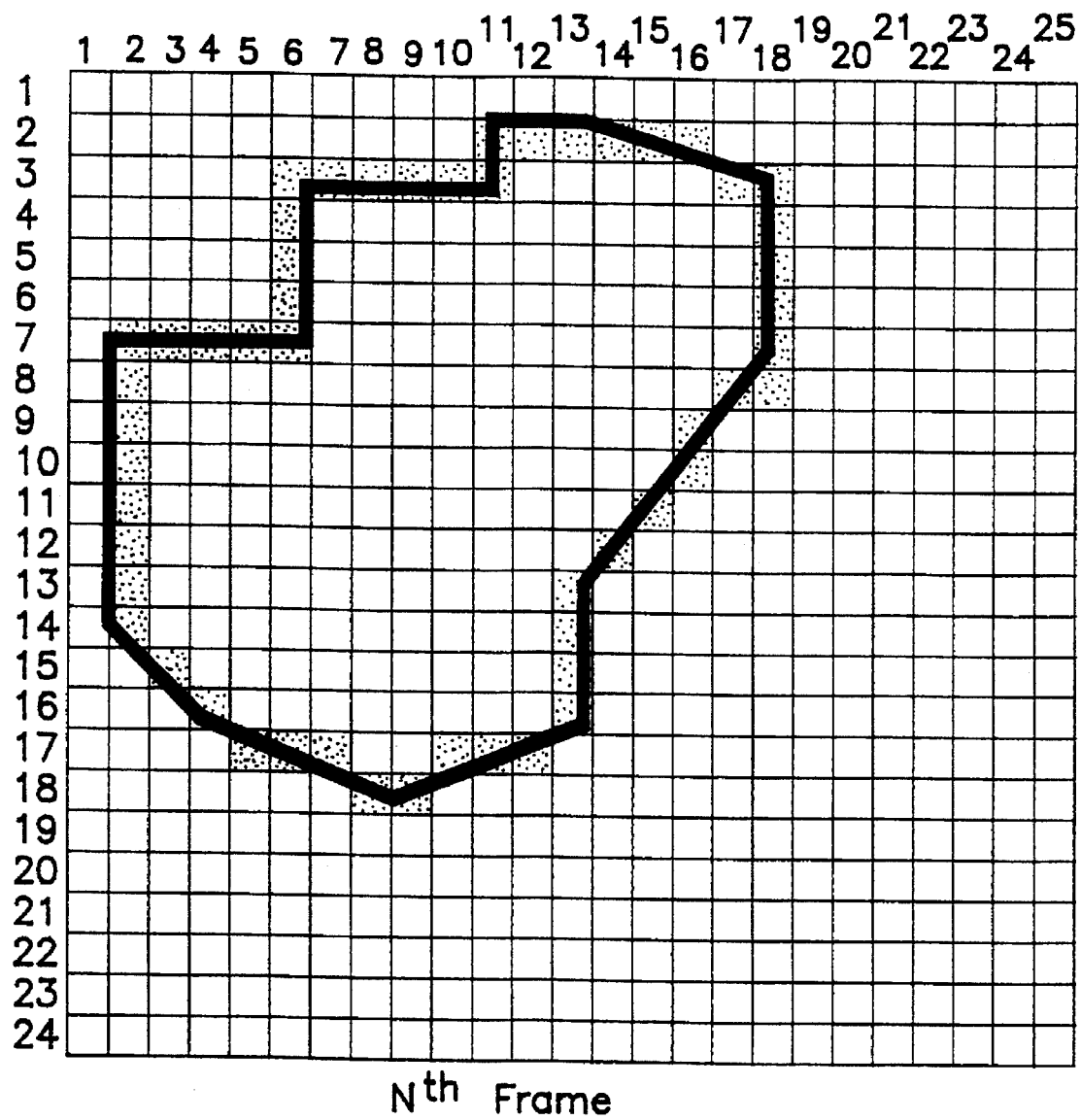
FIGS. 4A and 4B show the process of searching the movement distance from the boundary component of the object previously searched in the forward motion prediction to the next frame.
Figure 4B:
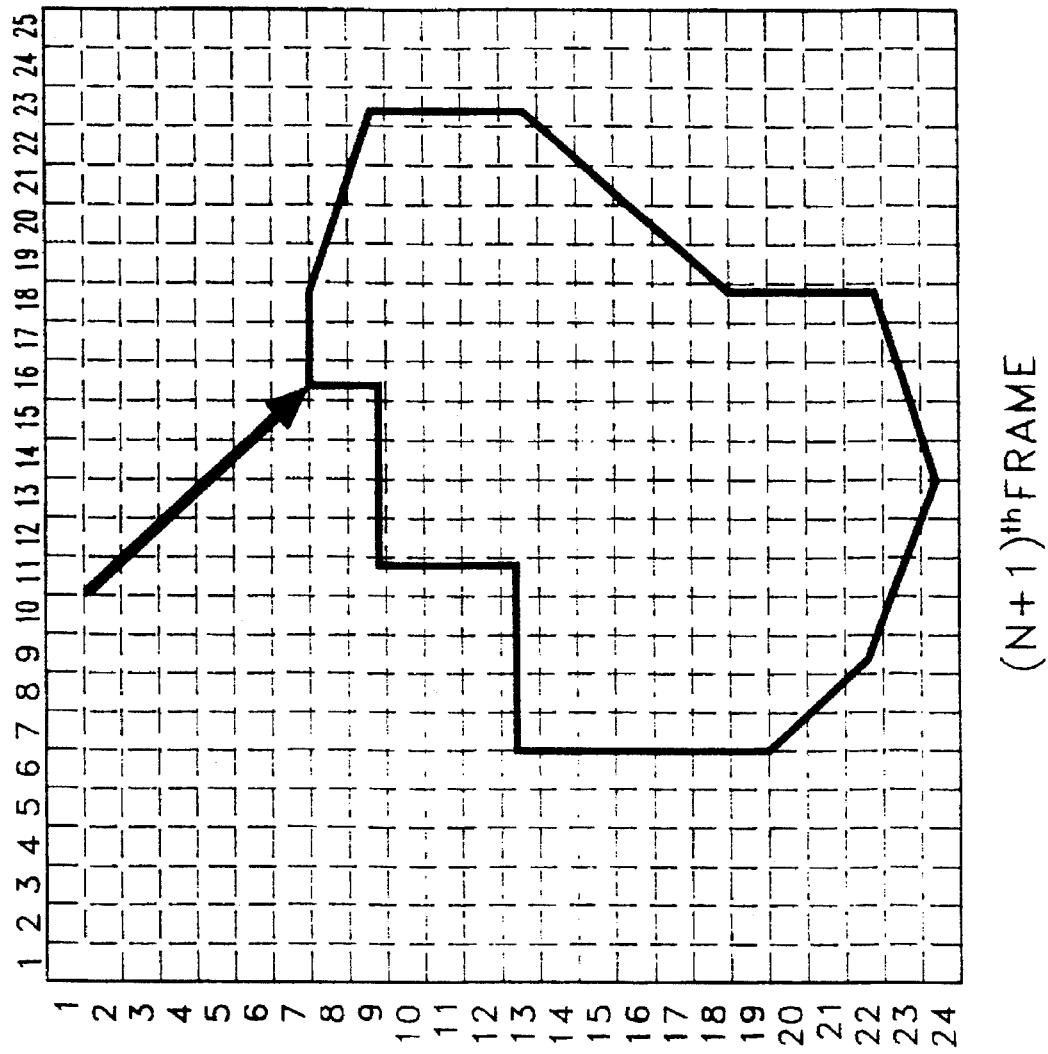

FIGS. 4A and 4B show the process of searching the motion vector by estimating the object-based motion using the boundary components (shape information) of the object searched in the current frame or a very small block. By using the boundary components of the object selected from the Nth frame, the domain having the smallest absolute value of errors is selected, by searching a predetermined domain of the (N+1)th frame in units of pixels or very small blocks, thereby selecting the movement distance as the motion vector of the object, which is indicated by a large arrow.

Next, the operation of the present invention will be described with reference to FIGS. 1 to 4B.

On the basis of the video sequence arrangement, the backward prediction and the forward prediction are alternated to perform a motion estimation, which is described with reference to FIG. 1.

One of the objectives of the present invention is to use the shape information of the searched object for estimating the backward and forward motion and to transmit only the data selected by a given mode selector among the backward and forward motion estimation results.

The backward motion prediction process will be described, first.

Digitized video sequences 10 are input and stored in a frame memory 20 sequentially in frame units. Subtractor 31 calculates a difference component between the current frame data stored in frame memory 20 and the output data from reproduction memory 37 which stores locally reproduced images for the reference of the transmitter stage, using the shape information and the motion information of the previously transmitted frame. Motion component filter 32 filters an inter-frame motion component from the difference component output from subtractor 31 and stores only the image portions where motion is substantially generated. Identical motion object filter 33 sorts the components having motion in the same direction among those portions where motion is substantially generated, indexes the same objects according to unit size, and stores the respectively indexed objects sequentially. First motion vector filter 34 estimates the direction in which the current object (Nth frame) has moved with respect to a previously reproduced image stored in reproduction memory 37, based on the objects having the same motion which are respectively stored in identical motion object filter 33. At this time, the portion having the smallest mean absolute error (MAE) of the reproduced pixel value and the value of the corresponding pixel constituting the object is selected as the motion vector. As the result, the motion vector selected with searching a defined domain is stored in first motion vector filter 34 and the boundary components (shape information) of the object are stored in shape information filter 35. The thus-obtained shape and motion information is input to mode and data selector 50.

Next, the forward motion prediction process will be described.

First, video data of the current frame, stored in frame memory 20, video data of the previous frame, stored in reproduction memory 37, shape information of the respective indexed objects, stored in the shape information filter 35 and used for predicting the backward motion, and data for the portion where the motion has been substantially generated, stored in motion component filter 32, are input to motion estimator 41. Motion estimator 41 estimates the motion of the object using the shape information of the object obtained from the previous frame and the domain information of the motion components of the current frame. Then, second motion vector 42 searches the motion vector, indicating where the reproduced image having corresponding shape information has moved, using only the shape information obtained from the previous frame, as shown in FIG. 4. At this time, the MAE value is used as the basis for the motion estimation.

The thus-obtained motion vector is stored in second motion vector filter 42. The index of the shape information used in the motion estimation is received from shape information filter 35 and then only this index information and motion information are transmitted to mode and data selector 50 via shape information indexer 43.

Mode and data selector 50 determines whether backward prediction data or forward prediction data is selected in accordance to the motion prediction mode of the current frame and depending on the frame arrangement shown in FIG. 2, so that the receiver side can reproduce the current frame simply using the shape information indexes from the previous frame.

In the case of dissimilar motion components of the current frame and previous frame, compensation for the domain for which the motion information is not filtered can be made by establishing a separate intra-frame mode for transmitting the domain information.

To summarize, with the backward motion prediction, the shape information and motion information (motion vector) of a same-motion object are transmitted. With the forward motion prediction, the motion is estimated using the shape information of the previously transmitted object and only the motion information is then transmitted, thereby conserving data by the shape information, which results in a considerable reduction of the information amount used in compression.

The present invention can be widely adopted for video communication systems such as a public switching telephone network, local area network (LAN), or wireless network. Specifically, since the present invention can be adopted for a moving video transmission in a mobile communication system, the application fields thereof extend over a wide range, including next generation international standard technology.

As described above, the bi-directional motion estimation method and apparatus thereof according to the present invention, in a low bit-rate motion, can find the precise motion vector compared to the existing block matching algorithm and depict the inter-frame motion with less information. Therefore, markedly less data (for compression) is used and reconstructed picture quality is improved.

Also, since the motion information is filtered and compensated in units of moving objects, the "blocking" effect of the image is only slightly evident. Particularly, in the case of a large object having little motion, e.g., digital video phone images, compression time can be saved.

What is claimed is:

1. A bi-directional motion estimation method in a low bit-rate moving image codec system, comprising the steps of:

(a) backward estimating the motion of an object in a series of frames having the same motion for the domain where motion is generated at a predetermined block in a frame, and filtering motion information representing the direction in which the object searched in the current frame has moved from the previous frame and shape information of the object;

(b) forward motion estimating for filtering motion information representing the direction in which the object is to be moved in the next frame and index information of the object, using the shape information of the object searched in the current frame by said step (a); and (c) selectively transmitting the motion information and shape information output in said step (a) or the motion and index information output in said step (b), in accordance with motion estimation modes of previously set frames.

2. A bi-directional motion estimation method as claimed in claim 1, wherein, in said step (c), among consecutive video sequences, only the first frame is transmitted to a receiver stage as an intra-frame, and thereafter, odd frames estimate the motion via a backward prediction mode and even frames estimate the motion via a forward prediction mode.

3. A bi-directional motion estimation apparatus in a low bit-rate moving image codec system, comprising:

backward motion estimation means for estimating the motion of an object in a series of frames having the same motion for the domain where motion is generated at a predetermined block in a frame and for filtering motion information representing the direction in which said object searched in the current frame has moved from the previous frame and shape information of said object;

forward motion estimation means for filtering motion information representing the direction in which said object is to be moved in the next frame and index information of said object, using said shape information of said object searched in the current frame by means of said backward motion estimation means; and mode and data selection means for selectively transmitting the motion information and shape information output from said backward motion estimation means or said motion and index information output from said forward motion estimation means, in accordance with motion estimation modes of previously set frames.

4. A bi-directional motion estimation apparatus as claimed in claim 3, wherein, in said mode and data selection means, among consecutive video sequences, only the first frame is transmitted to a receiver stage as an intra-frame, and thereafter, odd frames estimate the motion via a backward prediction mode and even frames estimate the motion via a forward prediction mode.

* * * * *